United States Patent
Wang et al.

(10) Patent No.: US 12,411,936 B2
(45) Date of Patent: Sep. 9, 2025

(54) ON-DEMAND TRUSTED EXTENDED REALITY ENVIRONMENTS

(71) Applicant: AT&T Intellectual Property I, L.P., Atlanta, GA (US)

(72) Inventors: Wei Wang, Harrison, NJ (US); Mikhail Istomin, Brooklyn, NY (US); Lars Johnson, Brooklyn, NY (US); Rachel Rosencrantz, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 116 days.

(21) Appl. No.: 17/993,646

(22) Filed: Nov. 23, 2022

(65) Prior Publication Data

US 2024/0169052 A1  May 23, 2024

(51) Int. Cl.
   *G06F 21/53* (2013.01)
   *G06F 21/55* (2013.01)

(52) U.S. Cl.
   CPC ............ *G06F 21/53* (2013.01); *G06F 21/554* (2013.01); *G06F 2221/034* (2013.01)

(58) Field of Classification Search
   CPC ... G06F 21/53; G06F 21/554; G06F 2221/034
   See application file for complete search history.

(56) References Cited

U.S. PATENT DOCUMENTS

| | | | |
|---|---|---|---|
| 2017/0181645 A1* | 6/2017 | Mahalingam | G16H 10/60 |
| 2022/0070232 A1* | 3/2022 | Young | G06T 19/003 |
| 2022/0109810 A1* | 4/2022 | Kancharlawar | H04N 7/157 |

* cited by examiner

*Primary Examiner* — Hany S. Gadalla
(74) *Attorney, Agent, or Firm* — Hartman & Citrin LLC

(57) ABSTRACT

The concepts and technologies disclosed herein are directed to on-demand trusted extended reality ("XR") environments. According to one aspect disclosed herein, a user device can create a trusted list identifying at least one trusted XR environment. The user device can connect to an untrusted XR server computer and can allow a user avatar associated with a user to enter an untrusted XR environment provided by the untrusted XR server. The user device can detect an event for which a trusted XR environment is desired. The user device can select the trusted XR environment to handle the event. The user device can select the trusted XR environment from the trusted list. The user device can instruct the untrusted XR server computer to teleport the user avatar from the untrusted XR environment to the trusted XR environment.

20 Claims, 6 Drawing Sheets

ON-DEMAND TRUSTED EXTENDED REALITY ENVIRONMENTS

BACKGROUND

The advent of metaverse as a potential successor to the Internet will bring a number of changes. One foreseeable change is the way in which people interact with non-physical environments. Today, interactions with the Internet are limited to text and multimedia consumption (known as web2—read and write). This media is usually static in nature, such as webpages with multimedia (e.g., images, audio, and/or video). More dynamic interactions are either limited (e.g., forums, chat rooms, social media groups, and the like) or handled in a strictly-controlled environment (e.g., voice, video, and/or text chat and multiplayer games). Metaverse (also known as web3—read, write, own) will allow for more interactive environments (e.g., virtual rooms) that incorporate aspects of extended reality ("XR"), such as virtual reality ("VR"), augmented reality ("AR"), and mixed reality ("MR").

In recent years, the widespread adoption of the work-from-home model has had negative effects on some workers due to less in-person interaction with peers. XR technology provides a safe environment for co-workers to meet in a virtual space and interact as if in-person. This can increase morale and decrease the negative effects of isolation. Moreover, as the cost of XR headsets continues to decrease, XR technology will continue to become more commonplace, allowing friends and families to engage in social events, holidays, and daily social interactions.

Metaverse is an ever-growing arena containing worlds created by various companies. Some spaces hosted by well-known companies in metaverse might be secure, similar to secure uniform resource locators ("URLs") today, but others might not be secure and may pose security risks. Currently, no authority exists that is responsible for assigning security labels to spaces within metaverse as secure or not secure. Additional challenges are created by the combination of the immersive nature of metaverse experiences and the fact that the objects in XR environment are dynamic and often transient. Additionally, with objects belonging to different owners and avatars that can take any form, ensuring the safety of these spaces is a challenge.

SUMMARY

Concepts and technologies are disclosed that are directed to on-demand trusted XR environments. According to one aspect disclosed herein, a user device can create a trusted list identifying at least one trusted XR environment. The user device can connect to an untrusted XR server computer and can allow a user avatar associated with a user to enter an untrusted XR environment provided by the untrusted XR server computer. The user device can detect an event for which a trusted XR environment is desired. In some embodiments, the user device can detect the event based upon receiving a direct request from the user. The event can include an interaction between the user and at least one additional user through the user avatar and at least one additional user avatar. Alternatively, the event can include an interaction between the user, represented as the user avatar, and a business (e.g., a financial institution). The user device can select the trusted XR environment to handle the event. The user device can select the trusted XR environment from the trusted list. In some embodiments, the trusted list is defined, at least in part, by the user. In other embodiments, the trusted list is defined, at least in part, based upon crowd-sourced data. The user device can instruct the untrusted XR server computer to teleport the user avatar from the untrusted XR environment to the trusted XR environment. After the event is handled, the user device can instruct a trusted XR server computer to teleport the user avatar back to the untrusted XR environment.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to on-demand trusted XR environments. According to embodiments, a user, at any time, in an untrusted XR environment, regardless of whether the user knows if the XR environment is secure or not, can choose to, on-demand, teleport to a trusted XR environment to perform one or more tasks within the trusted XR environment, and then teleport back into the untrusted XR environment when the trusted XR environment is no longer needed.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
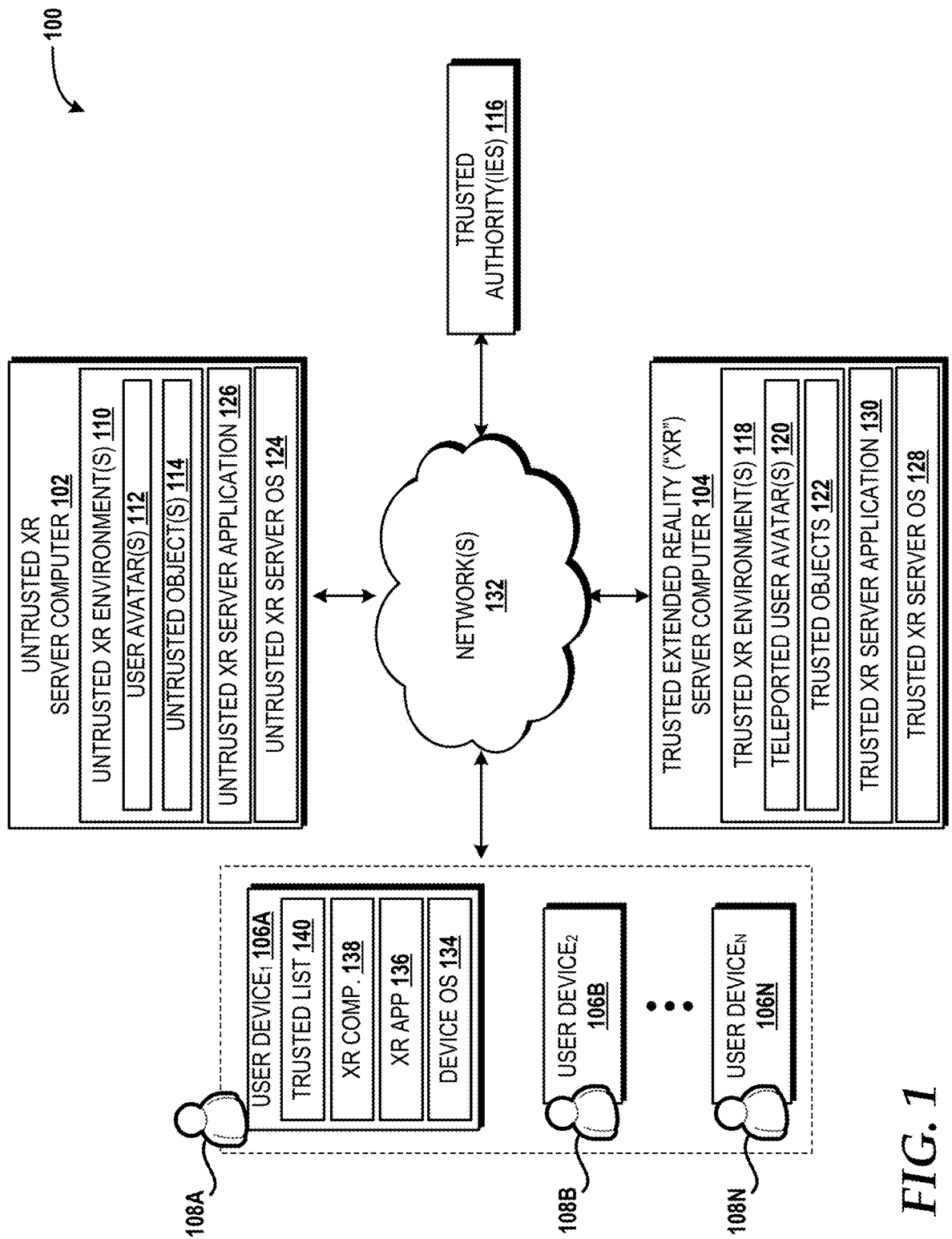
FIG. 1 is a block diagram illustrating aspects of an illustrative operating environment in which the concepts and technologies disclosed herein can be implemented.

Referring now to FIG. 1, aspects of an operating environment 100 in which various embodiments presented herein may be implemented will be described, according to an illustrative embodiment. The illustrated operating environment 100 includes an untrusted XR server computer 102 and a trusted XR server computer 104. Both the untrusted XR server computer 102 and the trusted XR server computer 104 can provide an XR service to a plurality of user devices 106A-106N (hereafter referred to collectively as "user devices 106" or individually as "user device 106 associated with a plurality of users 108A-108N, respectively (hereafter referred to collectively as "users 108" or individually as "user 108"). The XR service can be a virtual reality ("VR") service, an augmented reality ("AR") service, a mixed reality service, or any combination thereof. The XR service can create XR environments in which the users 108 can interact with each other and/or with other entities (not shown) such as businesses.

"Virtual reality" or "VR" is used herein to describe a concept that provides a computer-generated environment (also referred to herein as a "virtual environment") that the users 108 can explore via the user devices 106. A virtual environment can include a gathering of many individual objects that represent small parts of the overall environment. A virtual environment may be a single room, a house, a city, a world, or any other virtualization of a real-world environment. The virtual environment may be a completely imaginary environment that does not have a real-world analog. The virtual environment may be a combination of real-world and imaginary environments. A virtual object can represent any real-world object, such as furniture, individual avatars (i.e., representations of real-world users), animals (e.g., virtual pets and wildlife), vehicles, electronics, and the like. Each virtual object may belong to a virtual environment. A virtual object may be something that was created as part of the virtual environment. Alternatively, a virtual object may be something that was added at a later point by either the environment owner or another user.

A VR environment can be generated by any software framework designed for the creation and development of graphics. Some example software frameworks include, but are not limited to, UNREAL ENGINE (available from Epic Games), UNITY (available from Unity Technologies), CRYENGINE (available from Crytek), HAVOK VISION ENGINE (available from Havok), and open source software frameworks. In some embodiments, the software frameworks utilize graphics assets, such as textures, that include or are derived from photographs of the real-world environment that is to be virtualized. Those skilled in the art will appreciate the wide range of graphical fidelity, visual styles, and other attributes a particular VR environment may have, and as such, further details in this regard are not provided herein.

"Augmented reality" or "AR" is used herein to describe a concept in which at least a portion of a physical, real-world environment is augmented to include computer-generated data. The computer-generated data can include virtual objects that are presented over and/or spatially integrated with real-world objects of the physical, real-world environment. The virtual objects can include text, colors, patterns, gradients, graphics, other images, videos, animations, combinations thereof, and the like. Computer-generated data that augments in some manner a view of a physical, real-world environment and/or elements thereof is referred to herein generally as an "augmentation."

The AR service can provide a live view of a physical, real-world environment. In these embodiments, the AR service may utilize a camera component (best shown in FIG. 5) of the user device 106 to provide a live view of the physical, real-world environment to be augmented. In other embodiments, the AR service can provide a non-live view of a physical, real-world environment. In these embodiments, the non-live view can present a physical, real-world environment as a static image. Accordingly, a reality that is to be augmented need not be a present reality and can instead be a past reality, encapsulated in a photograph that is augmented at a later time such as the present, for example.

"Mixed reality" is used herein to describe a concept in which elements of VR and elements of AR are used together. The term "XR" is used herein to refer to VR-only, AR-only, or mixed reality.

In the illustrated example, the untrusted XR server computer 102 provides one or more untrusted XR environments 110 (hereafter referred to collectively as "untrusted XR environments 110" or individually as "untrusted XR environment 110") in which one or more user avatars 112 (hereafter referred to collectively as "user avatars 112" or individually as "user avatar 112"), which are digital representations of one or more of the users 108, can interact with each other and/or one or more untrusted objects 114 (hereafter referred to collectively as "untrusted objects 114" or individually as "untrusted object 114"). The untrusted objects 114 can include any XR object represented in the untrusted XR environment 110 that has not been verified by one or more trusted authorities 116 (hereafter referred to collectively as "trusted authorities 116" or individually as "trusted authority 116"). Generally, the untrusted XR environment 110 may provide a space in which the users 108, via the user avatars 112, can interact with each other through chat, interactive games, and/or other activities that do not require a secure, trusted environment.

The trusted XR server computer 104 provides one or more trusted XR environments 118 (hereafter referred to collectively as "trusted XR environments 118" or individually as "trusted XR environment 118") in which one or more teleported user avatars 120 (hereafter referred to collectively as "teleported user avatars 120" or individually as "teleported user avatar 120") can interact with each other and/or one or more trusted objects 122 (hereafter referred to collectively as "trusted objects 122" or individually as "trusted object 122"). The trusted objects 122 can include any XR object represented in the trusted XR environment 118 that has been verified by one or more of the trusted authorities 116 (e.g., certificate authority). Generally, the trusted XR environment 118 may provide a space in which the users 108, via the teleported user avatars 120, can interact with each other through chat, interactive games, and/or other activities that require a secure, trusted environment.

The untrusted XR server computer 102 can execute an untrusted XR server operating system ("OS") 124 and one or more application programs such as an untrusted XR server application 126. Similarly, the trusted XR server computer 104 can execute a trusted XR server OS 128 and one or more application programs such as a trusted XR server application 130. The untrusted XR server OS 124 and the trusted XR server OS 128 are computer programs for controlling the operation of the untrusted XR server computer 102 and the trusted XR server computer 104, respectively. The untrusted XR server application 126 and the trusted XR server application 130 are executable programs configured to execute on top of the untrusted XR server OS 124 and the trusted XR server OS 128, respectively, to provide various functions described herein.

The untrusted XR server computer 102, the trusted XR server computer 104, the user devices 106, and the trusted authorities 116 can communicate via one or more networks 132. An example network 400 is illustrated and described herein below with reference to FIG. 4.

The illustrated user devices 106 can be or can include one or more mobile telephones, smartphones, tablet computers, slate computers, smart watches, fitness devices, smart glasses (e.g., the GOOGLE GLASS family of products), a dedicated AR device, a dedicated VR device, a dedicated mixed reality device, a wearable device, mobile media playback devices, laptop computers, notebook computers, ultrabook computers, netbook computers, computers of other form factors, computing devices of other form factors, other computing systems, other computing devices, and/or the like. It should be understood that the functionality of the user devices 106 can be provided by a single device, by two or more similar devices, and/or by two or more dissimilar devices. For purposes of describing the concepts and technologies disclosed herein, the user device 106 is described herein as a smartphone. It should be understood that this embodiment is illustrative, and should not be construed as being limiting in any way.

In the illustrated example, a first user device 106A includes a device OS 134, an XR app 136, and an XR component 138. The other user devices 106B-106N can be configured the same as or similar to the first user device 106A. It should be understood, however, that the user devices 106 can include other components. Illustrative example architectures of the user devices 106 are described in greater detail herein with reference to FIGS. 3 and 5.

The device OS 134 can control the operation of the user device 106. In some embodiments, the device OS 134 includes the functionality of the XR app 136. The device OS 134 can be executed by one or more processors (best shown in FIGS. 3 and 5) to cause the user device 106 to perform various operations. The device OS 134 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The XR app 136 can execute on top of the device OS 134. The XR app 136 can be executed by one or more processors (best shown in FIGS. 3 and 5) to cause the user device 106 to perform various operations described herein. The XR app 136 can be a client-side application that communicates, via the network(s) 132, with the untrusted XR server application 126 executing on the untrusted XR server computer 102 to provide, at least in part, an untrusted XR service to the user 108 of the user device 106. The XR app 136 can be a client-side application that communicates, via the network(s) 132, with the trusted XR server application 130 executing on the trusted XR server computer 104 to provide, at least in part, a trusted XR service to the user 108 of the user device 106. The XR app 136, in some embodiments, can utilize the XR component 138 to provide, at least in part, an XR service to the user 108 of the user device 106. The illustrated embodiment of the XR component 138 represents the XR component 138 as an internal component of the user device 106. It should be understood that the XR component 138 alternatively may be an external component that is in communication with the user device 106 via a wired or wireless connection. The XR component 138, in some embodiments, is or includes a camera (e.g., a still camera and/or video camera), a sensor (e.g., an accelerometer, a global positioning system sensor, a solid state compass, or the like), a display (e.g., an integrated display, a head-mounted display, an eyeglasses display, a head-up display, an external monitor, a projection system, or a holographic display), an input device, or the like. The XR component 138, in other embodiments, is or includes a display (e.g., an integrated display, a head-mounted display, an eyeglasses display, a head-up display, an external monitor, a projection system, or a holographic display), an input device, a combination thereof, or the like. In some embodiments, the XR component 138 is META QUEST (available from META), PLAYSTATION VR (available from SONY), HTC VIVE (available from HTC and VALVE), MICROSOFT HOLOLENS (available from MICROSOFT), or the like. The XR app 136 can provide an interface, using the XR component 138, through which the user 108 can interact with the untrusted XR environment 110 provided, at least in part, by the untrusted XR server computer 102. The XR app 136 also can provide an interface, using the XR component 138, through which the user 108 can interact with the trusted XR environment 118 provided, at least in part, by the trusted XR server computer 104.

In the illustrated example, the first user device 106A also has a trusted environment list ("trusted list") 140. The other user devices 106B-106N can include similar lists. The trusted list 140 can be defined by the user 108, by the trusted authority 116, and/or crowd-sourced from other users (e.g., the users 108B-108N). In some embodiments, the trusted list 140 can identify the trusted XR environment(s) 118 that the user 108 personally trusts without external verification, such as via the trusted authority 116. In other embodiments, the trusted list 140 can identify the trusted XR environment(s) 118 that have been separately verified by a trusted entity, such as the trusted authority 116. In still other embodiments, the trusted list 140 can identify the trusted XR environment(s) 118 determined based upon crowd-sourced data. For example, the crowd-sourced data can include review data, and the determination of whether a given XR environment should be considered a trusted XR environment 118 can be based on review scores (e.g., 1-5 stars) and a specified review score threshold (e.g., above 4.5 stars).

As briefly mentioned above, the user 108 may engage in the untrusted XR environment 110 and then desire to be teleported (as a user avatar 112) to the trusted XR environment 118 to perform one or more tasks. The tasks can be anything the user 108 wants to do within the trusted XR environment 118 instead of the untrusted XR environment 110. A couple example tasks are private conversations and financial transactions. Other tasks are contemplated.

The concept of teleportation, as used herein, is the transfer of the user avatar 112 from the untrusted XR environment 110 to the trusted XR environment 118 (shown as the teleported user avatar 120) or vice versa. Additional details regarding teleportation will be described in greater detail herein below.

In some embodiments, the user 108 may want to understand what occurred in the untrusted XR environment 110 while the user avatar 112 was in the trusted XR environment 118. In these embodiments, the untrusted XR environment 110 can be recorded so that the user 108 can replay a recording of the untrusted XR environment 110 in the user's 108 absence. In this manner, the user 108 can review what happened in the untrusted XR environment 110 (e.g., interactions among other user avatars 112 and/or untrusted objects 114 while the user 108 was in the trusted XR environment 118). Moreover, the user 108 may establish one or more alarms that can be triggered upon specific events that occur within the untrusted XR environment 110 during the user's 108 absence. Alternatively or additionally, an alarm can be established based upon a timer, the expiration of which can notify the user 108 that the user 108 has spent too long in the trusted XR environment 118.

Figure 2:
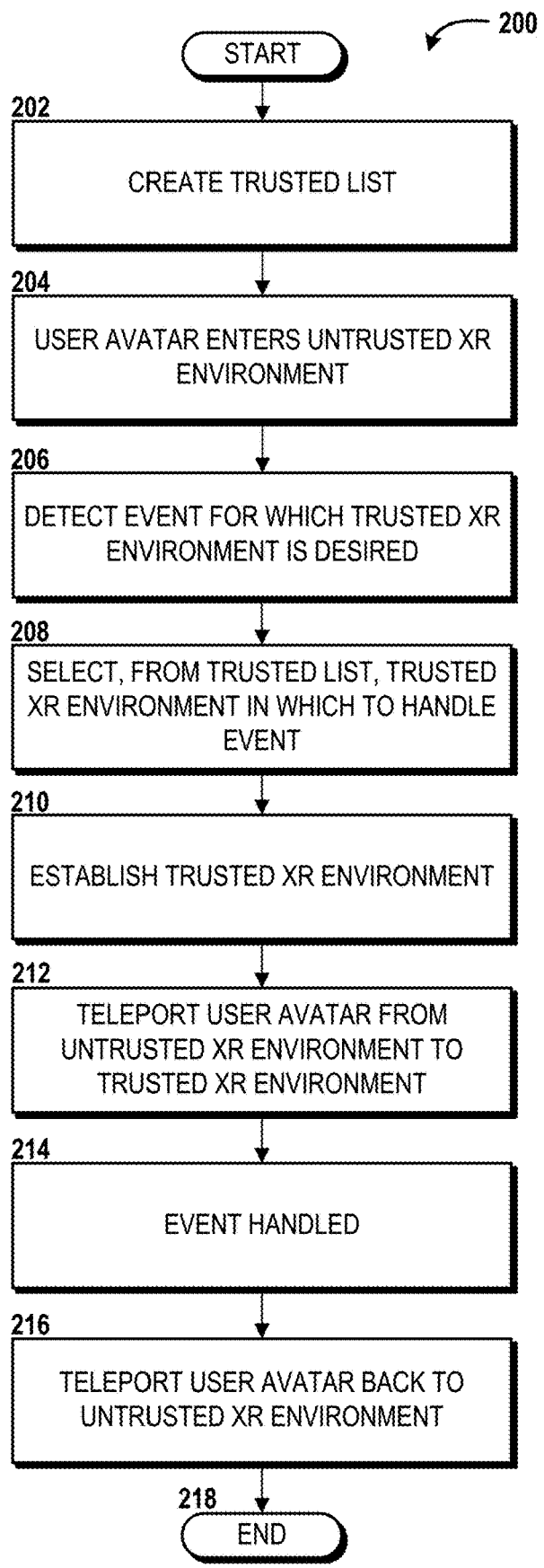
FIG. 2 is a flow diagram illustrating aspects of a method for providing on-demand trusted XR environments, according to an illustrative embodiment.

Turning now to FIG. 2, aspects of a method 200 for providing on-demand trusted XR environments 118 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in their respective entireties. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the untrusted XR server computer 102, the trusted XR server computer 104, the user device 106, the trusted authority 116, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the untrusted XR server computer 102, the trusted XR server computer 104, the user device 106, or the trusted authority 116, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the untrusted XR server computer 102, the trusted XR server computer 104, the user device 106, the trusted authority 116, or some combination thereof, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the user device 106 creates the trusted list 140. The trusted list 140 can be defined by the user 108, by the trusted authority 116, and/or crowd-sourced from other users (e.g., the users 108B-108N). In some embodiments, the trusted list 140 can identify the trusted XR environment(s) 118 that the user 108 personally trusts without external verification, such as via the trusted authority 116. In other embodiments, the trusted list 140 can identify the trusted XR environment(s) 118 that have been separately verified by a trusted entity, such as the trusted authority 116. In still other embodiments, the trusted list 140 can identify the trusted XR environment(s) 118 determined based upon crowd-sourced data. For example, the crowd-sourced data can include review data, and the determination of whether a given XR environment should be considered a trusted XR environment 118 can be based on review scores (e.g., 1-5 stars) and a specified review score threshold (e.g., above 4.5 stars).

From operation 202, the method 200 proceeds to operation 204. At operation 204, the user avatar 112 enters the untrusted XR environment 110. For example, the user 108 can instruct the XR application 136 to connect to the untrusted XR server computer 102 and allow the user avatar 112 to enter the untrusted XR environment 110. Since the untrusted XR environment 110 is untrusted, entry into the untrusted XR environment 110 does not require any authentication credentials to verify the identity of the user 108 associated with the user avatar 112.

From operation 204, the method 200 proceeds to operation 206. At operation 206, the user device 106 detects an event for which a trusted XR environment 118 is desired. The event can be a direct request made by the user 108 via the XR app 136. The event can be an interaction between two or more of the users 108 via respective user avatars 112 within the untrusted XR environment 110. The interaction may be better-suited in the trusted XR environment 118, and as such, the XR app 136 of the respective user devices 106 may prompt the users 108 to move the interaction to the trusted XR environment 118. The event may be an external request made, for example, by another entity such as the trusted authority 116. The event can be anything for which a trusted XR environment 118 is desired. The example events described above therefore should not be construed as being limiting in any way.

From operation 206, the method 200 proceeds to operation 208. At operation 208, the user device 106 selects, from the trusted list 140, the trusted XR environment 118 in which to handle the event. In some embodiments, the user device 106 can prompt the user 108 to provide the selection. In other embodiments, the user device 106 can make the selection based upon the nature of the event. Other methods of selection are contemplated.

From operation 208, the method 200 proceeds to operation 210. At operation 210, the trusted XR server computer 104 establishes the trusted XR environment 118. Alternatively, the trusted XR environment 118 may be pre-established. The trusted XR environment 118 may be temporary or on-going.

From operation 210, the method 200 proceeds to operation 212. At operation 212, the untrusted XR server computer 102 and the trusted XR server computer 104 coordinate to teleport the user avatar 112 from the untrusted XR server computer 102 to the trusted XR server computer 104 via the network(s) 132. From operation 212, the method 200 proceeds to operation 214. At operation 214, the event is handled within the trusted XR environment 118. From operation 214, the method 200 proceeds to operation 216. At operation 216, the trusted XR server computer 104 and the untrusted XR server computer 102 coordinate to teleport the user avatar 112 back to the untrusted XR server computer 102 via the network(s) 132.

From operation 216, the method 200 proceeds to operation 218. At operation 218, the method 200 ends.

Figure 3:
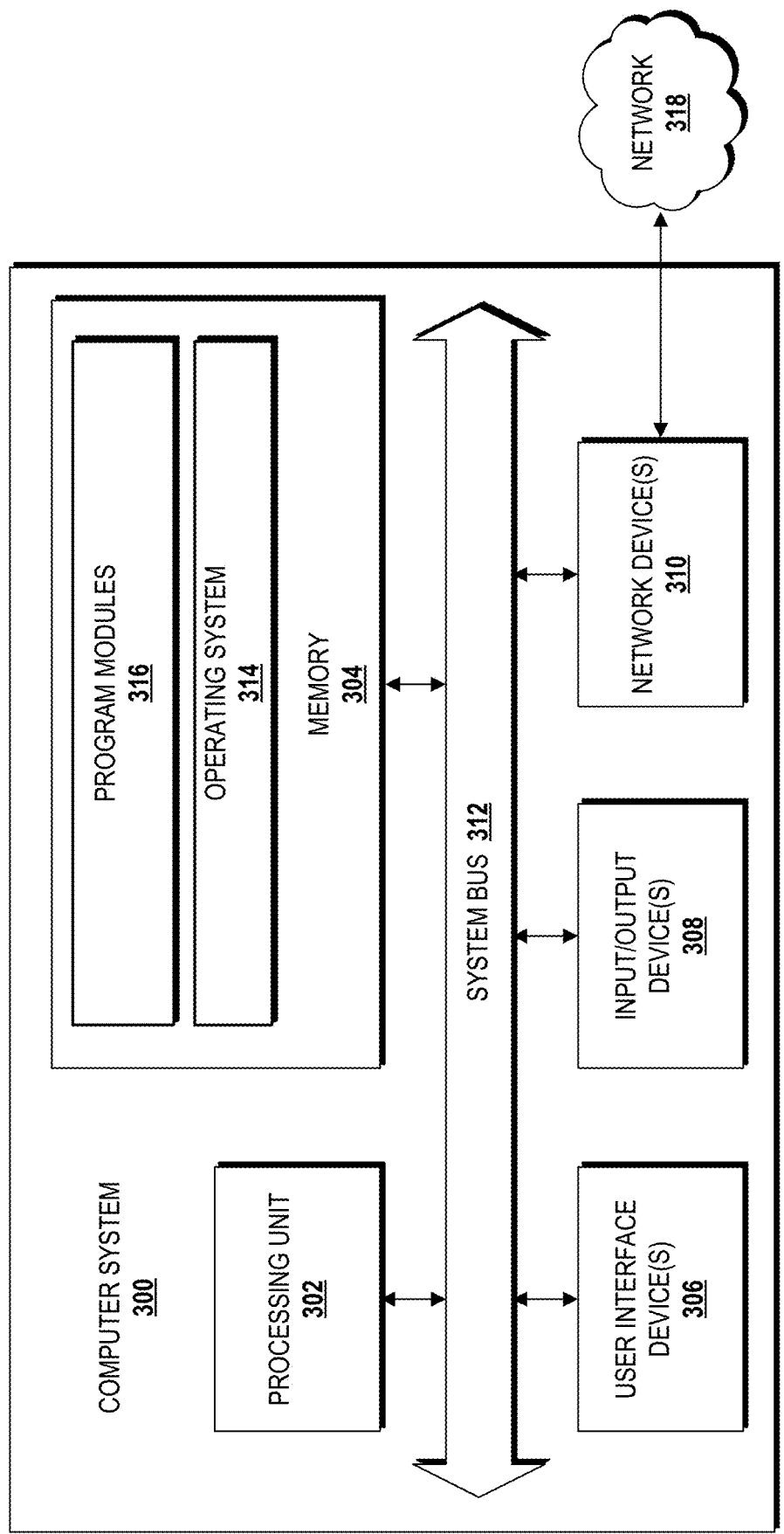
FIG. 3 is a block diagram illustrating an example computer system capable of implementing aspects of the embodiments presented herein.

FIG. 3 is a block diagram illustrating a computer system 300 configured to provide the functionality in accordance with various embodiments of the concepts and technologies disclosed herein. In some implementations, the untrusted XR server computer 102, the trusted XR server computer 104, the user device 106, and/or the trusted authority 116 utilize an architecture that is the same as or similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the MAC OSX and/or iOS families of operating systems from APPLE CORPORATION, other operating systems, and the like. The operating system 314 can be the untrusted XR server OS 124/trusted XR server OS 128 as illustrated and described with reference to FIG. 1.

The program modules 316 may include various software and/or program modules to perform the various operations described herein. The program modules 316 for the computer system 300 embodied as the untrusted XR server computer 102 can include the untrusted XR server application 126. The program modules 316 for the computer system 300 embodied as the trusted XR server computer 104 can include the trusted XR server application 130. The program modules 316 for the computer system 300 embodied as the user device 106 can include the XR app 136. The program modules 316 and/or other programs can be embodied in computer-readable media containing instructions that, when executed by the processing unit 302, perform one or more operations, such as the operations described herein above with reference to the method 200 illustrated in FIG. 2. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

Figure 4:
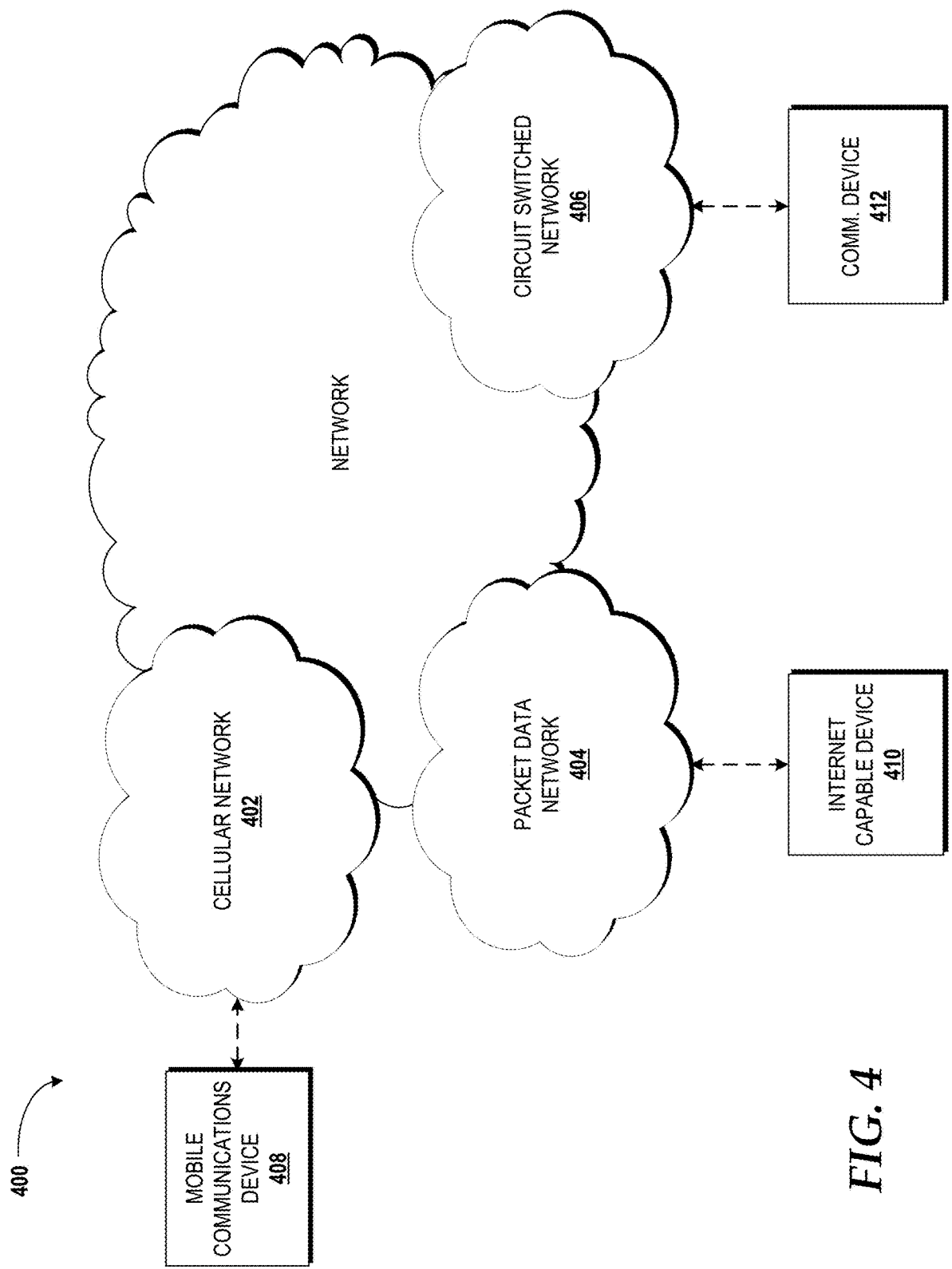
FIG. 4 schematically illustrates a network, according to an illustrative embodiment.

The network devices 310 enable the computer system 300 to communicate with other networks or remote systems via a network 318, such as the network(s) 132/400 (best shown in FIGS. 1 and 4). Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 318 may be a wired network such as, but not limited to, a wide area network ("WAN"), a wired LAN such as provided via Ethernet, a wired personal area network n ("PAN"), or a wired metropolitan area network ("MAN").

Turning now to FIG. 4, additional details of a network 400, such as the network(s) 132, are illustrated, according to an illustrative embodiment. The network 400 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, the user device 106, a cellular telephone, a user equipment, a mobile terminal, a PDA, a laptop computer, a handheld computer, and combinations thereof, can be operatively connected to the cellular network 402. The cellular network 402 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 402 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 402 also is compatible with 4G mobile communications standards such as Long-Term Evolution ("LTE"), or the like, as well as evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system ("POTS"). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, the user device 106, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 400 is used to refer broadly to any combination of the networks 402, 404, 406. It should be appreciated that substantially all of the functionality described with reference to the network 400 can be performed by the cellular network 402, the packet data network 404, and/or the circuit switched network 406, alone or in combination with other networks, network elements, and the like.

Figure 5:
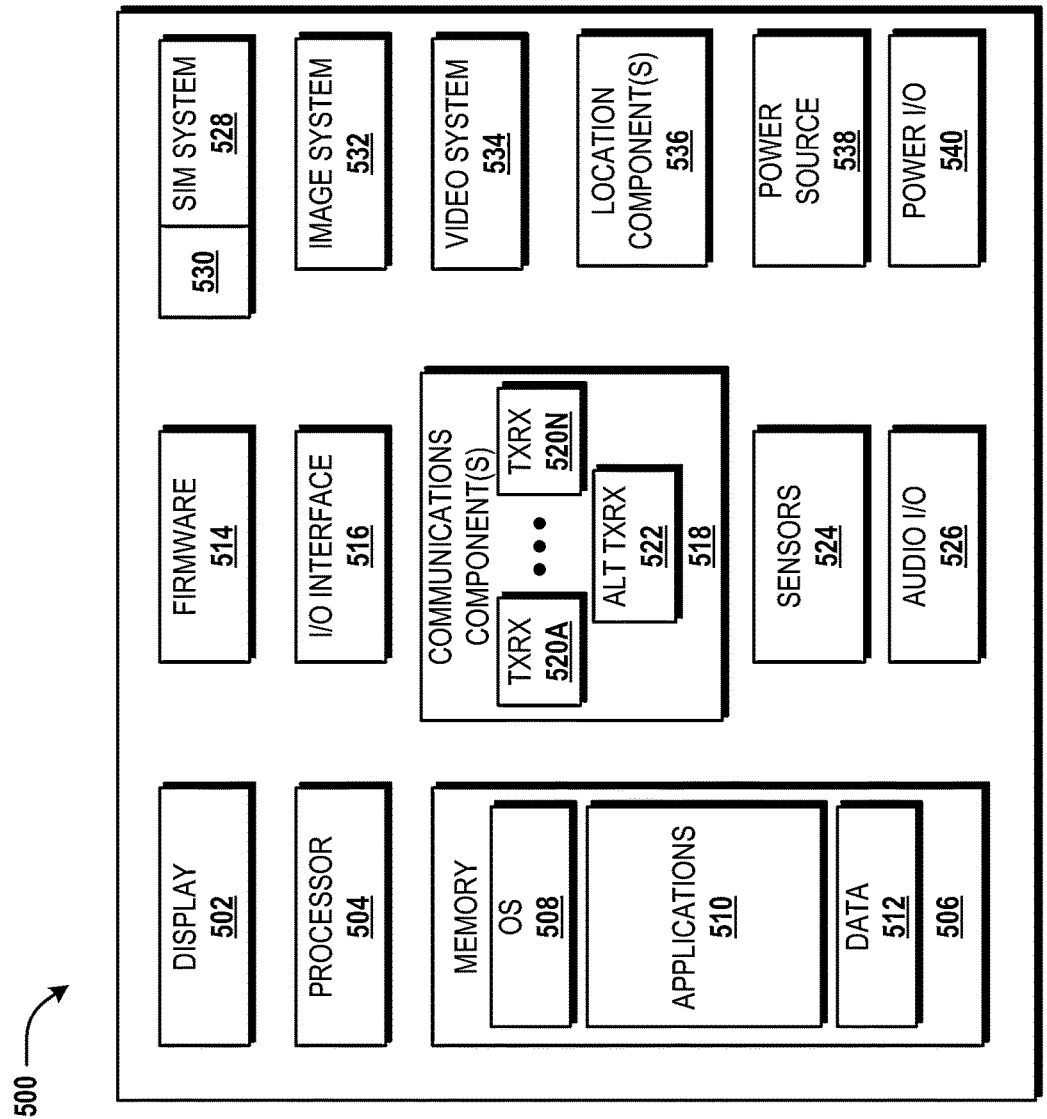
FIG. 5 is a block diagram illustrating an example mobile device and components thereof, according to an illustrative embodiment.

Turning now to FIG. 5, an illustrative mobile device 500 and components thereof will be described. In some embodiments, the user device 106 described above with reference to FIG. 1 can be configured as and/or can have an architecture similar or identical to the mobile device 500 described herein in FIG. 5. It should be understood, however, that the user device 106 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508 (e.g., the device OS 134), one or more applications 510 (e.g., the XR app 136), other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500.

According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, the XR component 138, combinations thereof, and the like. It should be appreciated that the I/O interface 516 may be used for communications between the mobile device 500 and a network device or local device.

The mobile device 500 also can include a communications component 515. The communications component 518 can be configured to interface with the processor 504 to facilitate wired and/or wireless communications with one or more networks described above herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA, CDMAONE, CDMA2000, LTE, and various other 2G, 2.5G, 3G, 4G, 5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from GPS devices, A-GPS devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
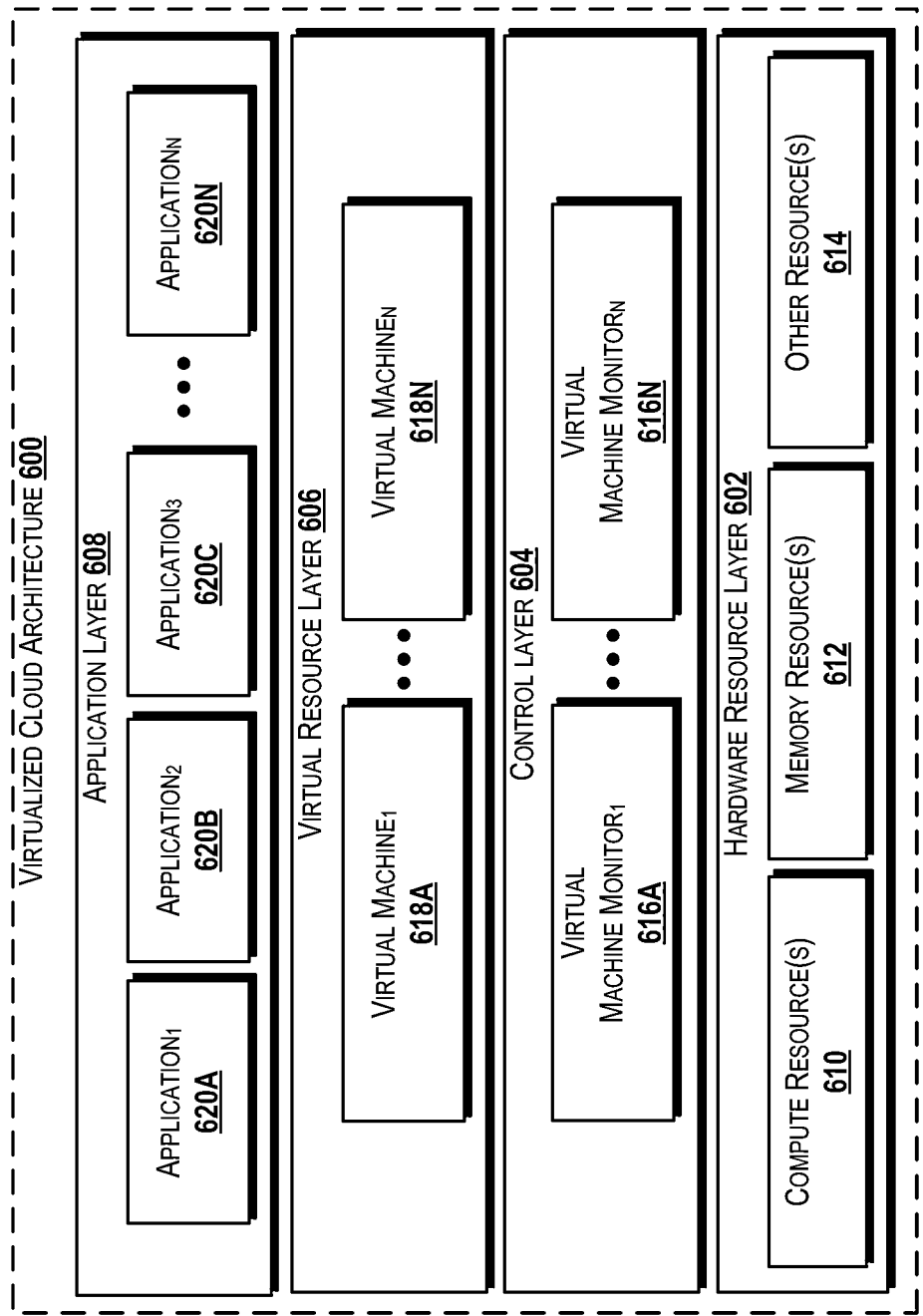
FIG. 6 is a diagram illustrating a virtualized cloud architecture capable of implementing aspects of the embodiments presented herein.

Turning now to FIG. 6, a block diagram illustrating an example virtualized cloud architecture 600 and components thereof will be described, according to an exemplary embodiment. In some embodiments, the virtualized cloud architecture 600 can be utilized to implement, at least in part, the untrusted XR server computer 102, the trusted XR server computer 104, aspects of the network(s) 132, portions thereof, and/or combinations thereof. The virtualized cloud architecture 600 is a shared infrastructure that can support multiple services and network applications. The illustrated virtualized cloud architecture 600 includes a hardware resource layer 602, a control layer 604, a virtual resource layer 606, and an application layer 608 that work together to perform operations as will be described in detail herein.

The hardware resource layer 602 provides hardware resources, which, in the illustrated embodiment, include one or more compute resources 610, one or more memory resources 612, and one or more other resources 614. The compute resource(s) 610 can include one or more hardware components that perform computations to process data, and/or to execute computer-executable instructions of one or more application programs, operating systems, and/or other software. The compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUAL-COMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 610 can be or can include one or more hardware components architected in accordance with an advanced reduced instruction set computing ("RISC") machine ("ARM") architecture, available for license from ARM HOLDINGS. Alternatively, the compute resources 610 can be or can include one or more hardware components architected in accordance with an x86 architecture, such an architecture available from INTEL CORPORATION of Mountain View, California, and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 616A-616N (also known as "hypervisors;" hereinafter "VMMs 616") operating within the control layer 604 to manage one or more virtual resources that reside in the virtual resource layer 606. The VMMs 616 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 610, the memory resources 612, the other resources 614, or any combination thereof. These abstractions are referred to herein as virtual machines ("VMs"). In the illustrated embodiment, the virtual resource layer 606 includes VMs 618A-618N (hereinafter "VMs 618"). Each of the VMs 618 can execute one or more applications 620A-620N in the application layer 608. The applications 620A-620N can include the untrusted XR server OS 124, the untrusted XR server application 126, the trusted XR server OS 128, and/or the trusted XR server application 130.

Based on the foregoing, it should be appreciated that concepts and technologies directed to on-demand trusted XR environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A user device comprising:
   a processor; and
   a memory that stores instructions that, when executed by the processor, cause the processor to perform operations comprising
   connecting to an untrusted extended reality server computer and allowing a user avatar associated with a user to enter an untrusted extended reality environment provided by the untrusted extended reality server computer,
   detecting an event for which a trusted extended reality environment is desired,
   selecting the trusted extended reality environment to handle the event, wherein the trusted extended reality environment is provided by a trusted extended reality server computer,
   instructing the untrusted extended reality server computer to teleport the user avatar from the untrusted extended reality environment to the trusted extended reality environment provided by the trusted extended reality server computer, and
   while the user avatar is within the trusted extended reality environment, recording the untrusted extended reality environment.

2. The user device of claim 1, wherein the operations further comprise creating a trusted list identifying a plurality of trusted extended reality environments including the trusted extended reality environment, and wherein selecting the trusted extended reality environment to handle the event comprises selecting the trusted extended reality environment from the trusted list.

3. The user device of claim 2, wherein the trusted list is defined, at least in part, by the user.

4. The user device of claim 2, wherein the trusted list is defined, at least in part, based upon crowd-sourced data.

5. The user device of claim 1, wherein detecting the event comprises receiving a direct request from the user.

6. The user device of claim 5, wherein the event comprises an interaction between the user and at least one additional user through the user avatar and at least one additional user avatar.

7. The user device of claim 5, wherein the event comprises an interaction between the user, represented as the user avatar, and a business.

8. A method comprising:
   connecting, by a user device comprising a processor, to an untrusted extended reality server computer and allowing a user avatar associated with a user to enter an untrusted extended reality environment provided by the untrusted extended reality server computer;
   detecting, by the user device, an event for which a trusted extended reality environment is desired;
   selecting, by the user device, the trusted extended reality environment to handle the event, wherein the trusted extended reality environment is provided by a trusted extended reality server computer;
   instructing, by the user device, the untrusted extended reality server computer to teleport the user avatar from the untrusted extended reality environment to the trusted extended reality environment provided by the trusted extended reality server computer; and
   while the user avatar is within the trusted extended reality environment, recording the untrusted extended reality environment.

9. The method of claim 8, further comprising creating, by the user device, a trusted list identifying a plurality of trusted extended reality environments including the trusted extended reality environment, and wherein selecting the trusted extended reality environment to handle the event comprises selecting the trusted extended reality environment from the trusted list.

10. The method of claim 9, wherein the trusted list is defined, at least in part, by the user.

11. The method of claim 9, wherein the trusted list is defined, at least in part, based upon crowd-sourced data.

12. The method of claim 8, wherein detecting, by the user device, the event comprises receiving, by the user device, a direct request from the user.

13. The method of claim 12, wherein the event comprises an interaction between the user and at least one additional user through the user avatar and at least one additional user avatar.

14. The method of claim 12, wherein the event comprises an interaction between the user, represented as the user avatar, and a business.

15. A computer-readable storage medium comprising computer-executable instructions that, when executed by a processor of a user device, cause the user device to perform operations comprising:
   connecting to an untrusted extended reality server computer and allowing a user avatar associated with a user to enter an untrusted extended reality environment provided by the untrusted extended reality server computer;
   detecting an event for which a trusted extended reality environment is desired;
   selecting the trusted extended reality environment to handle the event, wherein the trusted extended reality environment is provided by a trusted extended reality server computer;
   instructing the untrusted extended reality server computer to teleport the user avatar from the untrusted extended reality environment to the trusted extended reality environment provided by the trusted extended reality server computer; and
   while the user avatar is within the trusted extended reality environment, recording the untrusted extended reality environment.

16. The computer-readable storage medium of claim 15, wherein the operations further comprise creating a trusted list identifying a plurality of trusted extended reality environments including the trusted extended reality environment, and wherein selecting the trusted extended reality environment to handle the event comprises selecting the trusted extended reality environment from the trusted list.

17. The computer-readable storage medium of claim 16, wherein the trusted list is defined, at least in part, by the user.

18. The computer-readable storage medium of claim 16, wherein the trusted list is defined, at least in part, based upon crowd-sourced data.

19. The computer-readable storage medium of claim 15, wherein detecting the event comprises receiving a direct request from the user.

20. The computer-readable storage medium of claim 19, wherein the event comprises an interaction between the user and at least one additional user through the user avatar and at least one additional user avatar, or wherein the event comprises an interaction between the user, represented as the user avatar, and a business.

\* \* \* \* \*